United States Patent
Chang et al.

(10) Patent No.: US 9,448,131 B2
(45) Date of Patent: Sep. 20, 2016

(54) BATTERY PACK LEAK DETECTION ASSEMBLY AND METHOD

(71) Applicant: Ford Global Technologies, LLC, Dearborn, MI (US)

(72) Inventors: Xiaoguang Chang, Northville, MI (US); Xu Wang, Dearborn, MI (US); Josephine S. Lee, Novi, MI (US); Chuan He, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 536 days.

(21) Appl. No.: 14/010,971

(22) Filed: Aug. 27, 2013

(65) Prior Publication Data

US 2015/0063404 A1    Mar. 5, 2015

(51) Int. Cl.
| | |
|---|---|
| *G01M 3/00* | (2006.01) |
| *B60L 11/18* | (2006.01) |
| *H01M 10/48* | (2006.01) |
| *H01M 10/6565* | (2014.01) |

(52) U.S. Cl.
CPC ............. *G01M 3/002* (2013.01); *B60L 11/187* (2013.01); *H01M 10/486* (2013.01); *H01M 10/6565* (2015.04)

(58) Field of Classification Search
USPC .......................................................... 374/4
See application file for complete search history.

(56) References Cited

U.S. PATENT DOCUMENTS

| | | | | |
|---|---|---|---|---|
| 6,377,880 | B1* | 4/2002 | Kato | B60K 6/485 180/65.26 |
| 6,847,187 | B2* | 1/2005 | Kumar | H02H 7/0852 318/471 |
| 7,818,096 | B2* | 10/2010 | Dooley | H05K 7/20281 361/679.46 |
| 9,024,765 | B2* | 5/2015 | Hoesl | F24F 11/0086 165/108 |
| 2003/0178970 | A1* | 9/2003 | Minamiura | B60L 3/0023 320/116 |
| 2009/0071178 | A1* | 3/2009 | Major | B60H 1/00278 62/239 |
| 2010/0136391 | A1* | 6/2010 | Prilutsky | H01M 10/5004 429/62 |
| 2012/0251859 | A1 | 10/2012 | Payne et al. | |
| 2013/0205822 | A1* | 8/2013 | Heiland | H05K 7/2079 62/259.2 |
| 2014/0067323 | A1* | 3/2014 | Skelton | B60L 11/126 702/183 |

FOREIGN PATENT DOCUMENTS

| | | |
|---|---|---|
| DE | 102008059965 | 6/2010 |
| JP | 01107070 A * | 4/1989 |
| JP | 2002005775 A * | 1/2002 |
| JP | 2010139226 | 6/2010 |
| WO | 2012204519 | 8/2012 |

\* cited by examiner

*Primary Examiner* — Minh Phan
*Assistant Examiner* — Leon W Rhodes, Jr.
(74) *Attorney, Agent, or Firm* — Carlson, Gaskey & Olds, P.C.

(57) ABSTRACT

A method of detecting a leak in a battery pack according to an exemplary aspect of the present disclosure includes, among other things, calculating a predicted amount of thermal energy at a position, measuring an actual amount of thermal energy at the position, and comparing the predicted amount to the actual amount to identify if a battery pack is leaking.

19 Claims, 3 Drawing Sheets

BATTERY PACK LEAK DETECTION ASSEMBLY AND METHOD

BACKGROUND

This disclosure relates generally to a battery pack for an electric vehicle and, more particularly, to detecting undesirable thermal energy leaks and undesirable fluid leaks in the battery pack.

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), and battery electric vehicles (BEVs). Electric vehicles are typically equipped with a battery pack containing battery cells that store electrical power for powering the electric machine. The batteries may be charged prior to use, and recharged during drive by a regeneration brake or engine.

Extended exposure to significant thermal energy levels can shorten the useful life of a battery pack. Typically, the battery pack is thus thermally insulated from the surrounding environment. Further, a fan is used to move air through the battery pack. The moving air regulates thermal energy levels. The fan typically draws climate controlled air into the battery pack from a cabin of the vehicle. This air moves through the battery pack and exits to the cabin, the exterior of the vehicle, or trunk, etc. or combined of them.

A leak in the battery pack permits undesirable levels of fluid, thermal energy or both to communicate between an interior and an exterior of the battery pack. Insulation breakage during battery pack installation, customized vehicle work, etc. can cause leaks in the battery pack. Leaks lead to increased operating time for the fan, increased vehicle cabin temperatures, increased battery temperatures, reduced vehicle performance, etc. Technicians can undesirably devote considerable time to diagnosing and locating leaks.

SUMMARY

A method of detecting a leak in a battery pack according to an exemplary aspect of the present disclosure includes, among other things, calculating a predicted amount of thermal energy at a position, measuring an actual amount of thermal energy at the position, and comparing the predicted amount to the actual amount to identify if a battery pack is leaking.

In a further non-limiting embodiment of the foregoing method of detecting a leak in a battery pack, the method includes moving a fluid through the battery pack using a fluid movement device. The fluid enters the battery pack at an inlet and exits the battery pack at an outlet. The fluid movement device is positioned downstream from the inlet and upstream from the outlet relative to a direction of flow through the battery pack.

In a further non-limiting embodiment of any of the foregoing methods of detecting a leak in a battery pack, the leaking comprises movement of fluid to the battery pack through areas other than the inlet, movement of fluid from the battery pack through areas other than the outlet, or both.

The leak, in some examples, is a thermal leak through the insulation layer. Fluid may or may not move through the leak.

In a further non-limiting embodiment of any of the foregoing methods of detecting a leak in a battery pack, the fluid movement device is a fan.

In a further non-limiting embodiment of any of the foregoing methods of detecting a leak in a battery pack, the method comprises measuring thermal energy of fluid entering through the inlet to provide an inlet fluid amount of thermal energy, and comparing the inlet fluid amount to the predicted amount to identify a location of the leaking.

In a further non-limiting embodiment of any of the foregoing methods of detecting a leak in a battery pack, the method includes calculating that the leak is between the inlet and the fluid movement device if the inlet fluid amount of thermal energy is greater than the actual amount of thermal energy at the position.

In a further non-limiting embodiment of any of the foregoing methods of detecting a leak in a battery pack, the position is at a battery cell of the battery pack.

In a further non-limiting embodiment of any of the foregoing methods of detecting a leak in a battery pack, the position is within the battery pack.

In a further non-limiting embodiment of any of the foregoing methods of detecting a leak in a battery pack, the method includes identifying a leak when the actual amount is greater than the predicted amount by at least an established threshold value, for example, three degrees Celsius.

In a further non-limiting embodiment of any of the foregoing methods of detecting a leak in a battery pack, the method includes identifying a leak when the predicted amount is greater than the actual amount by at least an established threshold value, for example, three degrees Celsius.

In a further non-limiting embodiment of any of the foregoing methods of detecting a leak in a battery pack, the method includes measuring the actual amount of thermal energy using a sensor positioned at or adjacent to battery cell of the battery pack.

A leak detection assembly for a battery pack according to an exemplary aspect of the present invention includes, among other things, a sensor to determine an actual amount of thermal energy at an position, and a controller to calculate a predicted amount of thermal energy at the position, and to indicate that a battery pack includes a leak based on a comparison of the predicted amount to the actual amount.

In a further non-limiting embodiment of the foregoing leak detection assembly, the assembly includes a fluid movement device to move fluid from an inlet of the battery pack to an outlet of the battery pack.

In a further non-limiting embodiment of any of the foregoing leak detection assemblies, the fluid movement device comprises a fan.

In a further non-limiting embodiment of any of the foregoing leak detection assemblies, the leak comprises movement of fluid to the battery pack through areas other than the inlet, movement of fluid from the battery pack through areas other than the outlet, or both. The leak may also comprise a thermal leak or movement of thermal energy (and no fluid) from the battery pack through the leak.

In a further non-limiting embodiment of any of the foregoing leak detection assemblies, the assembly includes an inlet sensor to measure an amount of thermal energy in fluid entering the battery pack through the inlet, wherein the controller is configured to compare the inlet fluid amount to the predicted amount to identify a location of the leaking.

In a further non-limiting embodiment of any of the foregoing leak detection assemblies, the controller indicates a leak when the predicted amount is greater than the actual amount by at least an established threshold value, for example, three degrees Celsius.

In a further non-limiting embodiment of any of the foregoing leak detection assemblies, the controller indicates a leak when the actual amount is greater than the predicted amount by at least an established threshold value, for example, three degrees Celsius.

In a further non-limiting embodiment of any of the foregoing leak detection assemblies, the position is within the battery pack.

In a further non-limiting embodiment of any of the foregoing leak detection assemblies, the position is at or adjacent to a battery cell of the battery pack.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
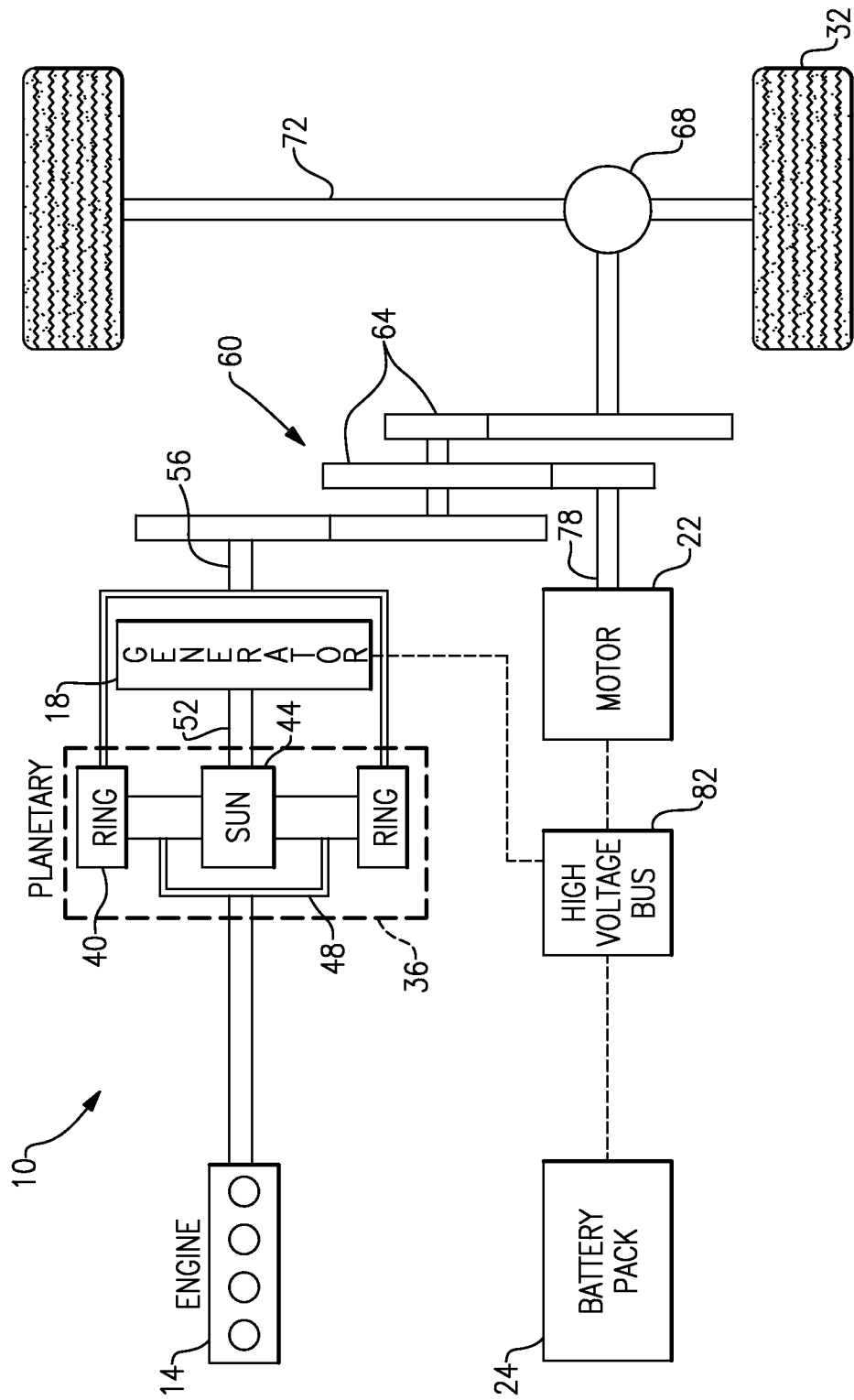
FIG. 1 illustrates a schematic view of an example electric vehicle powertrain.

FIG. 1 schematically illustrates a powertrain 10 for an electric vehicle. Although depicted as a hybrid electric vehicle (HEV), it should be understood that the concepts described herein are not limited to HEVs and could extend to other electrified vehicles, including but not limited to, plug-in hybrid electric vehicles (PHEVs) and battery electric vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 32 of the electric vehicle.

The engine 14, which is an internal combustion engine in this example, and the generator 18 may be connected through a power transfer unit 36, such as a planetary gear set. Of course, other types of power transfer units, including other gear sets and transmissions, may be used to connect the engine 14 to the generator 18. In one non-limiting embodiment, the power transfer unit 36 is a planetary gear set that includes a ring gear 40, a sun gear 44, and a carrier assembly 48.

The generator 18 may be driven by engine 14 through the power transfer unit 36 to convert kinetic energy to electrical energy. The generator 18 can alternatively function as a motor to convert electrical energy into kinetic energy, thereby outputting torque to a shaft 52 connected to the power transfer unit 36. Because the generator 18 is operatively connected to the engine 14, the speed of the engine 14 can be controlled by the generator 18.

The ring gear 40 of the power transfer unit 36 may be connected to a shaft 56, which is connected to vehicle drive wheels 32 through a second power transfer unit 60. The second power transfer unit 60 may include a gear set having a plurality of gears 64. Other power transfer units may also be suitable. The gears 64 transfer torque from the engine 14 to a differential 68 to ultimately provide traction to the vehicle drive wheels 32. The differential 68 may include a plurality of gears that enable the transfer of torque to the vehicle drive wheels 32. The second power transfer unit 60 is mechanically coupled to an axle 72 through the differential 68 to distribute torque to the vehicle drive wheels 32.

The motor 22 (i.e., the second electric machine) can also be employed to drive the vehicle drive wheels 32 by outputting torque to a shaft 78 that is also connected to the second power transfer unit 60. In one embodiment, the motor 22 and the generator 18 cooperate as part of a regenerative braking system in which both the motor 22 and the generator 18 can be employed as motors to output torque. For example, the motor 22 and the generator 18 can each output electrical power the battery pack 24 through a high voltage bus 82.

The battery pack 24 may be a high voltage battery that is capable of outputting electrical power to operate the motor 22 and the generator 18. Other types of energy storage devices and/or output devices can also be used with the electric vehicle.

Figure 2:
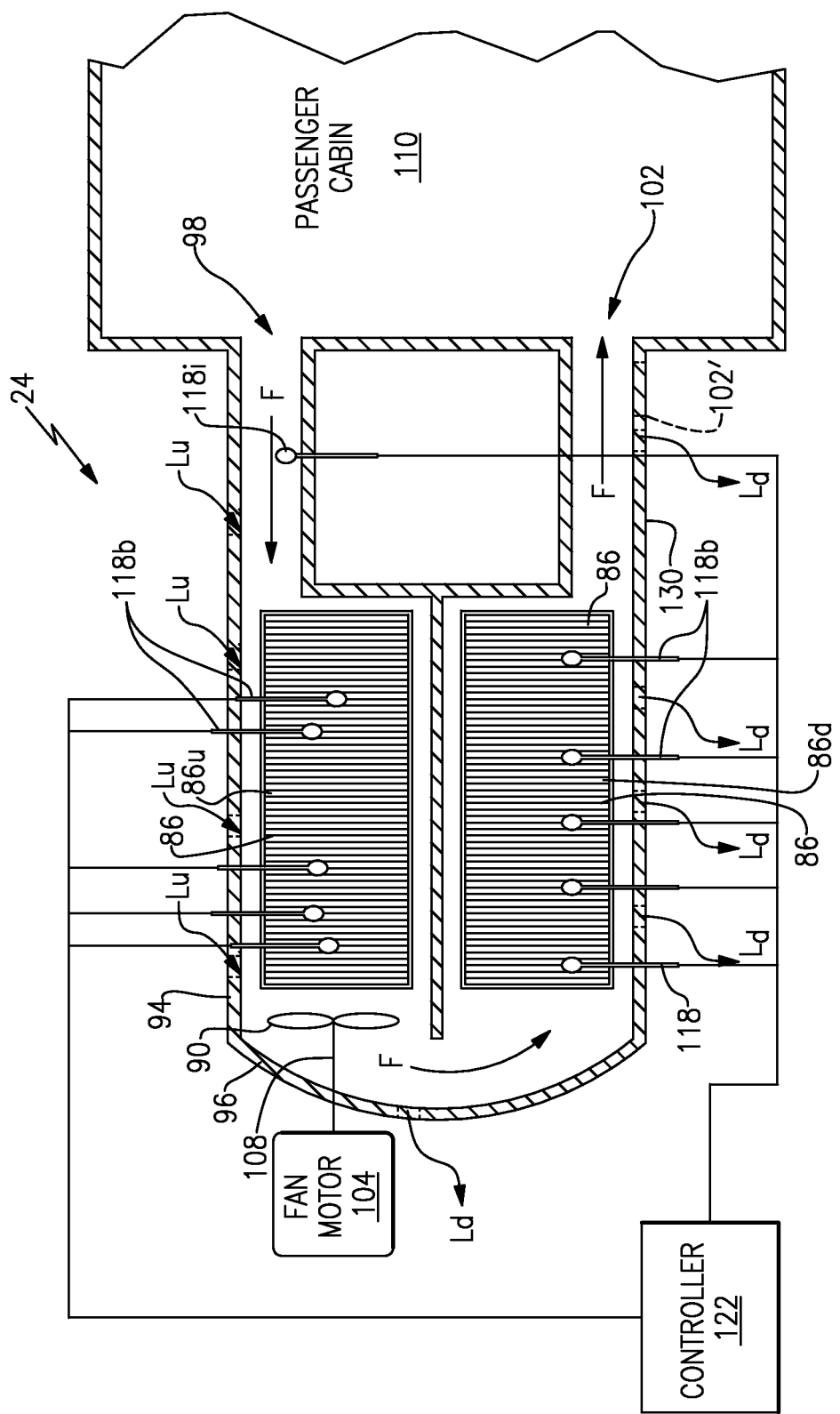
FIG. 2 illustrates a schematic view of an example battery pack used within the electric vehicle powertrain of FIG. 1.

Referring now to FIG. 2, the example battery pack 24 includes a plurality of individual battery cells 86 and a fan 90. A battery pack housing 94 holds the battery cells 86 and the fan 90. The battery pack housing 94 includes an insulative layer 96 to thermally insulate the battery pack 24. The battery pack housing 94 can include other layers in addition to the insulative layer 96.

The battery pack 24 includes a flowpath F extending from an inlet 98 to an outlet 102. The battery cells 86 are positioned within the flowpath F. The fan 90 moves a fluid along the flowpath F from the inlet 98 to the outlet 102. The fluid, in this example, is drawn from a passenger cabin 110 of the vehicle. The fluid moves from the outlet 102 back to the passenger cabin 110.

In another example, the fluid moves from the outlet 102 to an area outside of the passenger cabin 110, such as through an outlet 102'. The fluid may move through the outlet 102' instead of, or in addition to, moving through the outlet 102.

The fan 90 is a type of fluid movement device. A fan motor 104 drives a shaft 108 that extends through the battery pack housing 94 to drive the fan 90. The fan 90 is downstream from the inlet 98 and upstream from the outlet 102 relative to a general direction of flow along the flowpath F.

Some of the battery cells 86u are positioned upstream from the fan 90 relative to a general direction of flow through the battery pack 24. Other battery cells 86d are positioned downstream from the fan 90 relative to the general direction of flow through the battery pack 24.

Fluid moving along the flowpath moves across the battery cells 86, which regulates the amounts of thermal energy in the battery cells 86. In one example, fluid moves across the battery cells 86 to carry thermal energy away from the battery cells 86 and thereby lower a temperature of the battery cells 86.

A plurality of thermal energy sensors 118 extend into the battery pack 24. The sensors 118 collect thermal energy measurements from the battery pack 24. The temperatures of the battery cells 86 within the battery pack 24 can range, for example, from −40 to 65 degrees Celsius, so the example thermal energy sensors 118 are able to collect thermal energy measurements across at least this range.

In this example, some of the sensors 118b measure thermal energy amounts at ten separate locations that are within or near the groups of battery cells 86. Five of the sensors 118b measure thermal energy at locations within the battery cells 86u that are upstream from the fan 90. Five of the sensors 118b measure thermal energy amounts at locations within the battery cells 86d that are downstream from the fan 90.

The readings from the sensors 118b reveal an actual amount of thermal energy at the locations. When the location is on (or sufficiently close to) one or more of the battery cells 86, the readings from the sensors 118b represent an actual amount of thermal energy in those battery cells 86.

Another of the sensors 118i measures an amount of thermal energy in the flow moving through the inlet 98.

The sensors 118 are operably coupled to a controller 122 that collects the thermal energy readings from the sensors 118.

Leaks can develop in the battery pack housing 94. Leaks permit undesirable fluids, thermal energy, or both to move to or from the battery pack housing 94 at a location other than the inlet 98 and the outlet 102.

The example battery pack 24 includes upstream leaks $L_u$ that are upstream relative to the fan 90. The upstream leaks $L_u$ permit fluid or thermal energy outside the passenger cabin 110 to be drawn into the battery pack 24, rather than fluid from the passenger cabin 110.

The example battery pack 24 includes downstream leaks $L_d$ that are downstream relative to the fan 90. The downstream leaks $L_d$ permit fluid or thermal energy within the battery pack 24 to escape from the battery pack 24 though a location other than the outlet 102.

The upstream leaks $L_u$ offer little resistance to fluid moving into the battery pack 24 compared to the relatively restricted flow from the passenger cabin 110. The upstream leaks $L_u$ can cause an amount of thermal energy in the battery cells 86 to increase or decrease depending on the ambient temperature of the battery pack 24 and the temperature of the fluid in the environment that enters the battery pack 24 via the upstream leaks $L_u$. Fluid entering the battery pack 24 via the upstream leaks $L_u$ has not been conditioned within the passenger cabin 110.

In hot weather, for example, fluid moving into the battery pack 24 through the upstream leaks $L_u$ could be very hot, which could cause some areas of the battery pack 24 near the upstream leaks $L_u$ to heat up disproportionately to other areas. In cold weather, fluid moving into the battery pack 24 through the upstream leaks $L_u$ could be very cold and cause some areas of the battery pack 24 near the downstream leaks $L_d$ to cool disproportionately to other areas.

In an example embodiment of this disclosure, the controller 122 identifies that the battery pack 24 has leaks using, in part, readings from the sensors 118b, the sensor 118i, or both. If the controller 122 calculates that the battery pack 24 includes leaks, a technician can then inspect and repair the battery pack 24. If a leak is found, the leak can be repaired to ensure that flow across the battery cells 86 is not influenced by the leak.

Figure 3:
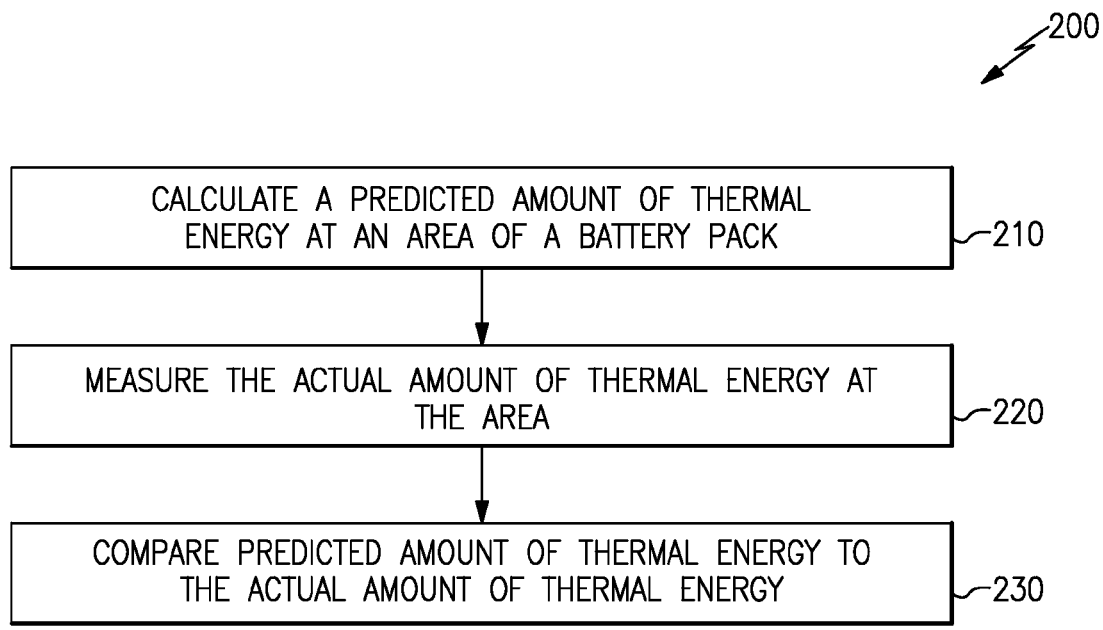
FIG. 3 illustrates the flow of an example method used to identify leaks within the battery pack of FIG. 2.

Referring now to FIG. 3 with continuing reference to FIG. 2, to detect leaks, an example method 200, at a step 210, calculates a predicted amount of thermal energy at a position within the battery pack 24. The method 200 also measures, at a step 220, the actual amount of thermal energy at the position. The method 200 may use, for example, readings of thermal energy from the sensors 118b to measure the actual amount of thermal energy at the position.

At a step 230, the method 200 compares the predicted amount of thermal energy to the actual amount of thermal energy. The method 200 detects leaks in the battery pack 24 based on this comparison.

The method 200 may rely, in part, on a battery pack temperature estimation equation, which has been reproduced below as equation (1).

$$\frac{d}{dt}[C_{p,cell} \cdot T_{cell}] + \frac{d}{dt}[E_{cell}(SOC)] = h \cdot (T_{air} - T_{cell}) + V_{cell} \cdot I \quad \text{Equation (1)}$$

In this example, $C_{p,\,cell}$ represents the heat capacity of the battery cell 86 and harnesses associated with the battery cell 86. $E_{cell}$ represents the electrical energy in the battery cell 86. $T_{air}$ represents a temperature of the air into the battery pack 118i, $T_{cell}$ represents a temperature of a battery cell 86, and h represents the heat transfer coefficient. $V_{cell}$ represents the terminal voltage of the cell 86. I represents the pack current. In the current sign convention, a positive value is for a charge current. Thus, equation (1), in this example, sets the thermal and electrical energy increase in the battery pack 24 to be equal to both the heat transfer into battery pack 24 and the power generated by the battery pack 24.

To calculate the estimated temperature at a position within the battery pack 24, such as a selected battery cell 86, the method 200 may determine heat transfer out ($HT_{out}$) of battery cell 86 using equation (2), which has been reproduced below:

$$HT_{out} = (h_0 + \text{fan\_air\_flow\_rate} \times h_{fan\_on}) \times (T_{air} - T_{cell}) \quad \text{Equation (2)}$$

The heat transfer coefficient $h_0$ and the fan on heat transfer coefficient $h_{fan\_on}$ are constants and can be obtained with fan off and fan on battery pack temperature test data. A person having skill in this art and the benefit of this disclosure would be able to obtain these coefficients.

The heat generated by the battery cell is, essentially, the electrical energy consumed. The heat generated by the battery cell is represented by $BP_{HG}$ and can be calculated using equation (3), which has been reproduced below:

$$BP_{HG} = I^2 \times R_{cell} \quad \text{Equation (3)}$$

In Equation (3), I is the electrical current through the battery pack 24 and $R_{cell}$ is the total electrical resistance (both cell and harnesses) of the battery cell 86.

The battery cell temperature $T_{cell}$ can then be estimated using Equation (4), which has been reproduced below:

$$BP_{HG} - HT_{out} = C_{p,cell} \times (d(T_{cell})/dt) \quad \text{Equation (4)}$$

Solving the above equations provides $T_{cell}$, which is an estimate of the thermal energy in the battery cell 86 associated with the position. To compensate the delay of sensor measured temperature, filter(s) and/or pure delay can be used to simulate the real sensor reading. In the example method, if temperature of the battery cell 86 (measured by one or more of the sensors 118b) is significantly different than estimated temperature of the battery cell $T_{cell}$, the battery pack 24 is considered to have a leak.

In some examples, the predicted amount of thermal energy and the actual amount of thermal energy are represented as temperatures measured in degrees Celsius. If the predicted amount equals or exceeds an established threshold value, the method 200 indicates that the battery pack 24 is leaking. For example, if the established threshold value is an absolute value of three degrees Celsius, and the predicted amount is three or more degrees Celsius greater than the measured amount, the method 200 indicates that the battery pack 24 is leaking. In addition, if the predicted amount is three or more degrees Celsius less than the actual amount of thermal energy, the method 200 indicates that the battery pack 24 is not leaking. In this example, the threshold value is calibratable and can be adjusted based on specific requirements, such as battery pack 24 size.

In one example, the battery pack 24 is only to be considered leaking if, in addition to the predicted amount varying three or more degrees from the actual amount, a fault associated with the sensor 118$b$ has not also been detected within a certain timeframe, say this drive cycle. An example fault is a sensor 118$b$ that has failed and does not provide a reading, for example.

A further example embodiment of this disclosure can determine the general positions of leaks within the battery pack 24 to assist the technician inspecting the battery pack 24. For example, in hot weather, the air outside the battery pack 24 is relatively hot, and the thermal energy levels of the battery cells 86 upstream from the leak will be higher than those downstream from the leak. The controller 122 calculates the location within the battery pack 24 where the temperature transitions from a lower to a higher temperature. This location is then flagged as the likely location of the leak.

The technician begins a search for the leak in the flagged location, which can help reduce inspection time. The controller 122 uses information collected by the sensors 118$b$, the sensor 118$i$, or both to calculate the location of the temperature transition.

Identifying the general location of the leak could involve calculating whether the leak is on, for example, the driver or passenger side of the battery pack 24. Identifying the general location of the leak could be more specific, such as a specific battery cell 86 that is closest to the leak.

The controller 122 can identify that the leak is an upstream leak $L_u$, in one example, when the temperature of fluid moving out of the outlet 102 into the passenger cabin 110 is elevated. This may be due to the flow from the passenger cabin 110 mixing with the hotter fluid entering the flowpath F through the upstream leak $L_u$. The fluid moving out of the outlet will cause the temperature measured by the inlet sensor 118$i$ to be higher than the temperature measured by the sensors 118$b$ upstream from the upstream leak $L_u$.

In one example, the controller 122 can identify that the leak is a downstream leak $L_d$. Fluid can move out of the battery pack 24 through the downstream leak $L_d$ instead of through the outlet 102. The fluid moves through the path of the downstream leak $L_d$ rather than through the outlet 102 due to less air resistance along the path provided by the downstream leak $L_d$ versus the resistance associated with the outlet 102. The resistance of the outlet 102 is typically higher than the resistance at the location of the leak due to a pipe 130 and the structure of the outlet 102 providing a relatively open path to the passenger cabin 110.

The controller 122 calculates an area having the leak recognizing that areas of the battery pack 24 downstream from the leak will have elevated temperatures relative to areas of the battery pack 24 upstream from the leak. The relative elevated temperatures are due to less air movement across the areas downstream from the leak.

In some examples, if the battery pack 24 includes leaks both upstream and downstream from the fan 90, fluid moving through the leak paths will be cycled out of the battery pack 24. The battery pack 24 will then use flow from the area around the pack instead of passenger cabin 110 and the battery pack 24 will be heated very quickly. Fan speed will have little impact on the ability of the fan 90 to reduce the temperature of the battery cells 86 within the battery pack 24.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments. Further, unless otherwise specified, the steps may be performed in any order.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of detecting a leak in a battery pack, comprising:
    calculating a predicted amount of thermal energy at a position;
    measuring an actual amount of thermal energy at the position;
    moving a fluid through the battery pack using a fan as a fluid movement device: and
    comparing the predicted amount to the actual amount to identify if a battery pack is leaking the fluid.

2. The method of claim 1, wherein the fluid enters the battery pack at an inlet and exits the battery pack at an outlet, the fluid movement device positioned downstream from the inlet and upstream from the outlet relative to a direction of flow through the battery pack.

3. The method of claim 1, wherein the leaking comprises movement of fluid to the battery pack through areas other than an inlet where the fluid enters the battery pack, movement of fluid from the battery pack through areas other than an outlet where fluid exits the battery pack, or both.

4. The method of claim 1, further comprising measuring an thermal energy of fluid entering through an inlet to provide an inlet fluid amount of thermal energy, comparing the inlet fluid amount to the predicted amount to identify a location of the leaking.

5. The method of claim 4 further comprising calculating that the leak is between the inlet and the fluid movement device if the inlet fluid amount of thermal energy is greater than the actual amount of thermal energy at the position.

6. The method of claim 1, wherein the position is at a battery cell of the battery pack.

7. The method of claim 1, wherein the position is within the battery pack.

8. The method of claim 1, further comprising identifying a leak when the actual amount is greater than the predicted amount by at least an established threshold value.

9. The method of claim 1, further comprising identifying a leak when the predicted amount is greater than the actual amount by at least an established threshold value.

10. The method of claim 1, further comprising measuring the actual amount of thermal energy using a sensor positioned at or adjacent to battery cell of the battery pack.

11. A leak detection assembly for a battery pack, comprising: a sensor to determine an actual amount of thermal energy at an a position; and a fluid movement device to move gas from an inlet to an outlet of the battery pack: and a controller to calculate a predicted amount of thermal energy at the position, and to indicate that a battery pack includes a leak of the fluid based on a comparison of the predicted amount to the actual amount.

12. The leak detection assembly of claim 11, wherein the fluid movement device comprises a fan.

13. The leak detection assembly of claim 12, further comprising a battery pack housing holding a first plurality of battery cells, a second plurality of battery cells, and the fan, wherein the fan is located downstream from the first plurality of battery cells and upstream from the second plurality of battery cells relative to a general direction of flow of the fluid from the inlet to the outlet.

14. The leak detection assembly of claim 11, wherein the leak comprises movement of fluid to the battery pack through areas other than the inlet, movement of fluid from the battery pack through areas other than the outlet, or both.

15. The leak detection assembly of claim 12, further comprising an inlet sensor to measure an amount of thermal energy in fluid entering the battery pack through the inlet, wherein the controller is configured to compare the inlet fluid amount to the predicted amount to identify a location of the leaking.

16. The leak detection assembly of claim 12, wherein the controller indicates the leak when the predicted amount is greater than the actual amount by at least an established threshold value.

17. The leak detection assembly of claim 12, wherein the controller indicates the leak when the actual amount is greater than the predicted amount by at least an established threshold value.

18. The leak detection assembly of claim 12, wherein the position is within the battery pack.

19. The leak detection assembly of claim 12, wherein the position is at or adjacent to a battery cell of the battery pack.

* * * * *

UNITED STATES PATENT AND TRADEMARK OFFICE
CERTIFICATE OF CORRECTION

PATENT NO. : 9,448,131 B2  
APPLICATION NO. : 14/010971  
DATED : September 20, 2016  
INVENTOR(S) : Xiaoguang Chang et al.

It is certified that error appears in the above-identified patent and that said Letters Patent is hereby corrected as shown below:

IN THE CLAIMS:

In claim 15, column 9, line 18; delete "12" and replace with --11--

In claim 16, column 10, line 5; delete "12" and replace with --11--

In claim 17, column 10, line 9; delete "12" and replace with --11--

In claim 18, column 10, line 13; delete "12" and replace with --11--

In claim 19, column 10, line 15; delete "12" and replace with --11--

Signed and Sealed this  
Twenty-ninth Day of November, 2016

Michelle K. Lee  
*Director of the United States Patent and Trademark Office*